(12) United States Patent
Nagabhirava et al.

(10) Patent No.: US 11,294,807 B2
(45) Date of Patent: Apr. 5, 2022

(54) DELAYED WRITE FAILURE LOGGING

(71) Applicant: Western Digital Technologies, Inc., San Jose, CA (US)

(72) Inventors: Rajeev Nagabhirava, Santa Clara, CA (US); Avichay Haim Hodes, Kfar Ben-Nun (IL); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 471 days.

(21) Appl. No.: 16/452,128

(22) Filed: Jun. 25, 2019

(65) Prior Publication Data

US 2020/0409843 A1    Dec. 31, 2020

(51) Int. Cl.
*G06F 11/00* (2006.01)
*G06F 12/0804* (2016.01)
*G06F 11/14* (2006.01)
*G06F 12/10* (2016.01)

(52) U.S. Cl.
CPC ...... *G06F 12/0804* (2013.01); *G06F 11/1471* (2013.01); *G06F 12/10* (2013.01); *G06F 2201/82* (2013.01); *G06F 2212/1032* (2013.01)

(58) Field of Classification Search
CPC ............. G06F 11/1471; G06F 11/0751; G06F 11/0778; G06F 12/0804; G06F 12/10; G06F 12/0868; G06F 12/0246; G06F 2201/82; G06F 2212/1032; G06F 2212/1028; G06F 2212/7201; Y02D 10/00
USPC ...................................................... 714/1–57
See application file for complete search history.

(56) References Cited

U.S. PATENT DOCUMENTS

| | | |
|---|---|---|
| 7,093,101 B2 | 8/2006 | Aasheim et al. |
| 8,516,172 B1 | 8/2013 | Karamcheti et al. |
| 8,713,252 B1 * | 4/2014 | de la Iglesia ........... G06F 13/28 711/112 |
| 8,792,273 B2 | 7/2014 | Ellis et al. |
| 9,489,249 B2 | 11/2016 | Stenfort |
| 10,009,438 B2 | 6/2018 | Das |

(Continued)

FOREIGN PATENT DOCUMENTS

CN    103514095 B    8/2016

OTHER PUBLICATIONS

International Search Report and Written Opinion issued in International Patent Application No. PCT/US2019/066877, dated Mar. 19, 2020 (8 pages).

(Continued)

*Primary Examiner* — Sarai E Butler
(74) *Attorney, Agent, or Firm* — Patterson & Sheridan, LLP; Steven H. Versteeg (57) ABSTRACT

The present disclosure generally relates to a method and device for reduce the amount of energy used to revert data within a storage device to a consistent state after a power loss event. Once power is lost from a host device, and prior to complete shutdown, a log is created within non-volatile memory (NVM) of the storage device. The log contains logical block addresses (LBAs) corresponding to data that experienced a write failure. At the next power-on event, the log is checked to see if any LBAs are present. If LBAs are present in the log, then the data that experienced a write failure can be properly written to the storage device.

20 Claims, 5 Drawing Sheets

(56) References Cited

U.S. PATENT DOCUMENTS

| | | | |
|---|---|---|---|
| 10,061,655 B2 | 8/2018 | Nemawarkar et al. | |
| 10,139,884 B2 | 11/2018 | Pardoe | |
| 2007/0271422 A1* | 11/2007 | Osaki | G06F 21/78 |
| | | | 711/154 |
| 2009/0249010 A1* | 10/2009 | Kawada | G06F 11/1435 |
| | | | 711/162 |
| 2010/0023682 A1* | 1/2010 | Lee | G06F 12/0866 |
| | | | 711/E12.001 |
| 2016/0070486 A1 | 3/2016 | Anderson et al. | |
| 2016/0085445 A1 | 3/2016 | Lee et al. | |
| 2016/0350003 A1* | 12/2016 | Kanno | G06F 3/0688 |
| 2017/0024140 A1 | 1/2017 | Shivanand et al. | |
| 2017/0177374 A1 | 6/2017 | Morning-Smith et al. | |
| 2017/0185335 A1* | 6/2017 | Pardoe | G06F 1/3296 |
| 2017/0329706 A1* | 11/2017 | Nemawarkar | G06F 11/1441 |
| 2018/0024920 A1* | 1/2018 | Thomas | G06F 12/0246 |
| | | | 711/103 |
| 2020/0081830 A1* | 3/2020 | Desai | G06F 12/0246 |
| 2021/0157726 A1* | 5/2021 | Guyer | G06F 12/0804 |

OTHER PUBLICATIONS

Micron Technology Inc.; "How Mircon SSD's Handle Unexpected Power Loss" A Micron White Paper; www.micron.com/-/media/client/global/documents/products/white-paper/ssd_power_loss_protection_white_paper_lo.pdf (4 pages).

* cited by examiner

DELAYED WRITE FAILURE LOGGING

BACKGROUND OF THE DISCLOSURE

Field of the Disclosure

Embodiments of the present disclosure generally relate to a method and device for reducing the amount of energy used to revert data within a storage device to a consistent state after a power loss event.

Description of the Related Art

In order to optimize storage environments for cost and feature scaling, hyperscale storage users are increasingly adopting client grade solid state devices (SSDs) in server environments. Hyperscale storage users have constraints on power failure protection. Enterprise grade devices generally include a set of capacitors in order to maintain data coherency during a sudden power loss. Client grade devices, which do not have capacitors, do not guarantee data in flight during a sudden power loss. Rather, client grade devices recover control data and rebuild a consistent state after the next power-up.

Enterprise grade devices use power in the capacitors in order to commit any in-flight data to NAND, but because client grade devices do not have such a feature, in flight data in client grade devices is lost. The in-flight data is discarded, and the NAND may include partially committed data. There is currently no feature that allows a client grade device to maintain a consistent data set during an unexpected power loss. Rather, it is the responsibility of the host device to roll back uncommitted transactions.

More capacitors naturally seems like a reasonable solution to client grade devices. However, capacitors significantly increase the cost of a storage device. Additionally, capacitors reduce the attractiveness of a client grade device in a data center environment.

What is needed is a way to reduce the amount of energy required to revert data within a storage device to a consistent state after a power loss event so that client grade devices may be sued in a data center.

SUMMARY OF THE DISCLOSURE

The present disclosure generally relates to a method and device for reduce the amount of energy used to revert data within a storage device to a consistent state after a power loss event. Once power is lost from a host device, and prior to complete shutdown, a log is created within non-volatile memory (NVM) of the storage device. The log contains logical block addresses (LBAs) corresponding to data that experienced a write failure. At the next power-on event, the log is checked to see if any LBAs are present. If LBAs are present in the log, then the data that experienced a write failure can be properly written to the storage device.

In one embodiment, a storage device comprises: a non-volatile memory; and a controller configured to, upon detection of a power loss event, write LBA ranges to a log stored in the non-volatile memory and to provide the LBA ranges to a host device.

In another embodiment, a storage device comprises: memory means; means to write LBA ranges to a log storage in the memory means upon detection of a power loss event; and means to provide the LBA ranges to a host device.

In another embodiment, a storage device comprises: at least one memory device containing a delayed write failure log page; and a controller coupled to the at least one memory device, the controller configured to: detect a power loss event; enumerate all completed write commands in which data was not committed to the memory device; writing one or more LBA ranges to the log page, wherein the one or more LBA ranges correspond to the data that was not committed to the memory device; and deliver the one or more LBA ranges to a host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a method and device for reduce the amount of energy used to revert data within a storage device to a consistent state after a power loss event. Once power is lost from a host device, and prior to complete shutdown, a log is created within non-volatile memory (NVM) of the storage device. The log contains logical block addresses (LBAs) corresponding to data that experienced a write failure. At the next power-on event, the log is checked to see if any LBAs are present. If LBAs are present in the log, then the data that experienced a write failure can be properly written to the storage device.

As noted above, enterprise grade SSDs use local capacitors to provide energy in case of a power loss. When power is lost, the SSD will flush all in-flight data to the memory device (i.e., NAND). Capacitors add a significant cost to the enterprise grade SSDs. One strategy to reduce the cost is to use capacitors on the host side, which can supply power to devices in order to complete committing data. The host side capacitors reduce individual device cost, but does increase host side cost and complexity as different storage devices have different timing and power requirements. Since client-grade devices are not optimized for power loss protection, the duration and associated cost can increase dramatically.

The solutions discussed herein address the issue by redefining the rules by reducing the amount of data that requires committing to just a single page. The solution takes into account that the host device does not need all of the in-flight data, just a reliable way of maintaining consistent state. In data center environments, there are typically multiple copies of the data in different tiers of storage, and the data can be recovered as long as there is a way of identifying which LBA ranges need to be restored from other locations.

Herein, the term "delayed write failure" is used to refer to the condition in which a write command was completed from the point of view of the host, but the payload of the write command was not fully committed to the storage device memory (i.e., NAND) and is not recoverable from the storage device memory after a sudden power loss. The delayed write failure includes data which was in transfer buffers, was coalesced into a block which was not fully written, or which suffered an unrecovered program failure during the power loss event.

As discussed herein, LBA ranges that are affected by a delayed write failure are recorded in a log page that is provided back to the host device. The LBA ranges may also be marked as bad in order to trigger an exception on the host, allowing the host to recover the data from other tiers of storage. A capacitor will be present on either the device side or host side to commit the log itself. However, the amount of time required to write a single 4K log page is considerably less than that required for all in-flight data, which can be many MBs depending on DRAM capacity and transfer buffer size.

The delayed write failure log page is a log page made available to the host after power up. In addition to the log page, the device may optionally mark affected LBA ranges as bad and return either a standardized or a code if the host attempts to read the data from these ranges.

Figure 1:
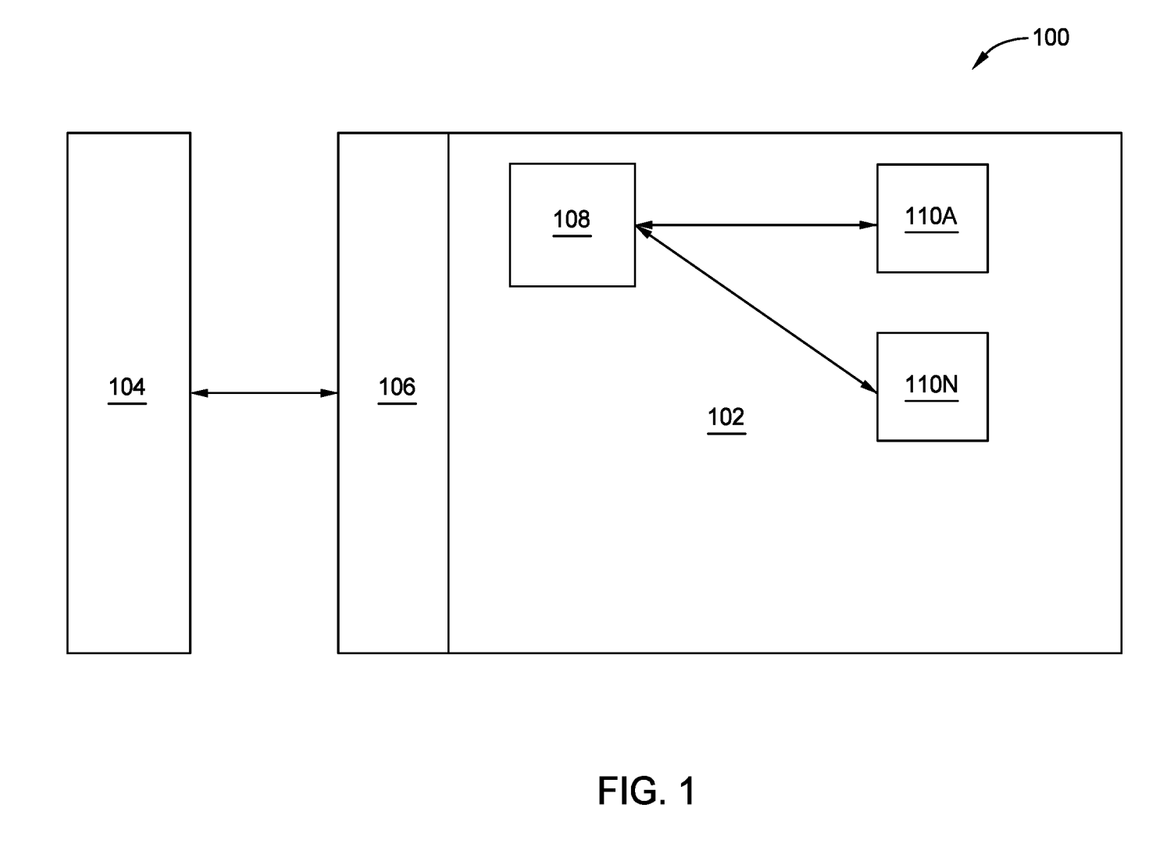
FIG. 1 is a schematic illustration of a storage device coupled to a host device according to one embodiment.

FIG. 1 is a schematic illustration of a storage system 100 including a storage device 102 coupled to a host device 104 according to one embodiment. The storage device 102 includes an interface 106, a controller 108, and one or more memory devices 110A-110N. In operation, the host device 104 sends read and/or write commands to the storage device 102 through the interface 106. The controller 108 reads and/or writes the data from/to the one or more memory devices 110A-110N. In one embodiment, the one or more memory devices 110A-110N are non-volatile storage devices such as NAND. It is to be understood that the storage device 102 and the host device 104 each have additional components not shown.

Figure 2:
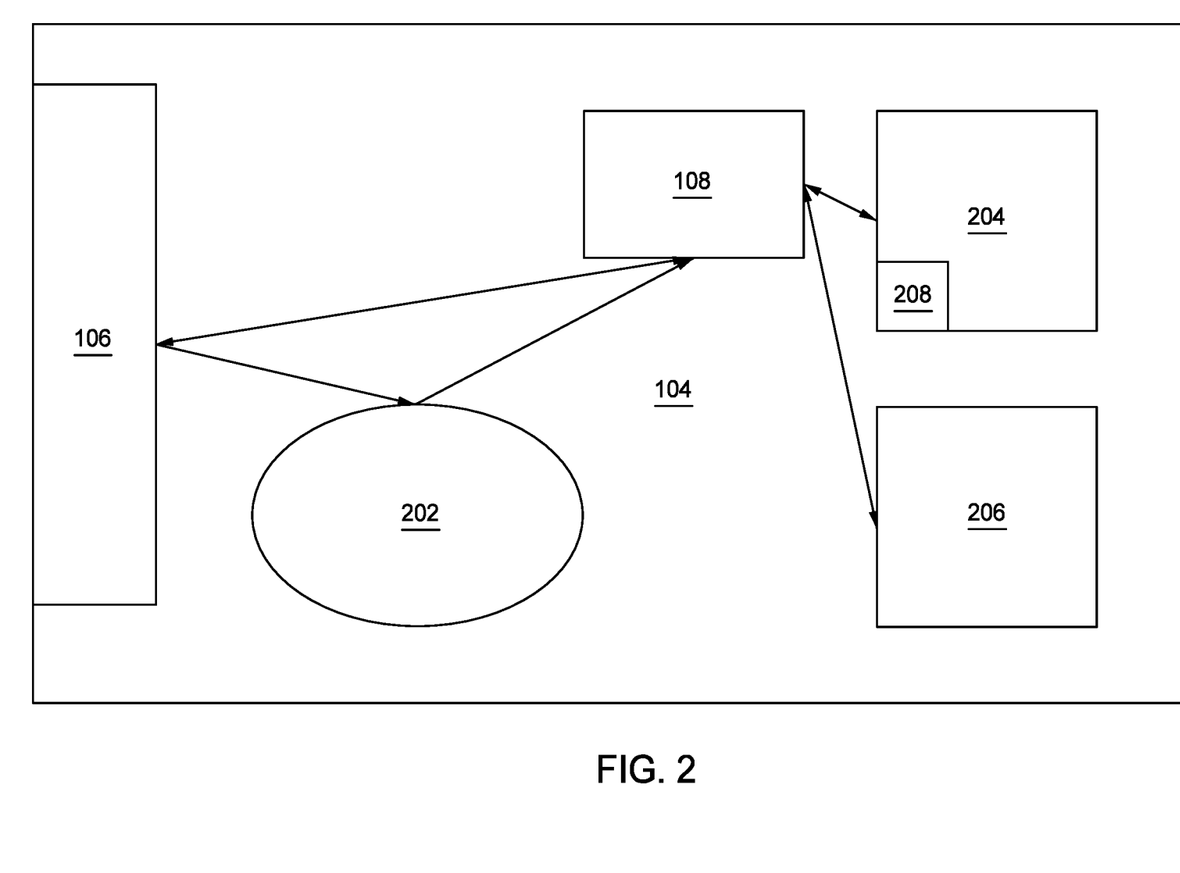
FIG. 2 is a schematic illustration of a storage device according to one embodiment.

FIG. 2 is a schematic illustration of a storage device 102 according to one embodiment that includes multiple memory devices 204 and 206. The storage device 102 includes at least one capacitor 202 that is used to provide sufficient power to write LBA ranges to a log page 208 of a memory device 204 during a power loss event. In other words, the at least one capacitor 202 provides sufficient power to enable the controller 108 to write LBA ranges to the log page 208 that is present in a memory device 204 when a delayed write failure event occurs. As shown in FIG. 2, the at least one capacitor 202 is coupled to the controller 108 to provide sufficient power to the controller 108. The at least one capacitor 202 is also coupled to the interface 106 so that the at least one capacitor 202 can receive power from the host device 104 during normal operations.

The power from the host device 104 charges up the at least one capacitor 202 until the at least one capacitor 202 has reached full capacity. The at least one capacitor 202, once fully charged, remains in an equilibrium state of continuously discharging power to the storage device 102 while continuously recharging with power from the host device 104. At the time of a power loss event, no additional power is received by the at least one capacitor 202 and, as such, the at least one capacitor drains in power without recharging. At the instant a power loss event occurs, the interface 106 is the first portion of the storage device 102 to realize that there is a power loss event and therefore provides a notification to the controller 108 that a power loss event has occurred, which triggers the controller 108 to start the delayed write failure log page writing. Thus, the amount of capacitance needed for the storage device 102 is an amount that is sufficient to provide enough power to write a single log page.

Figure 3:
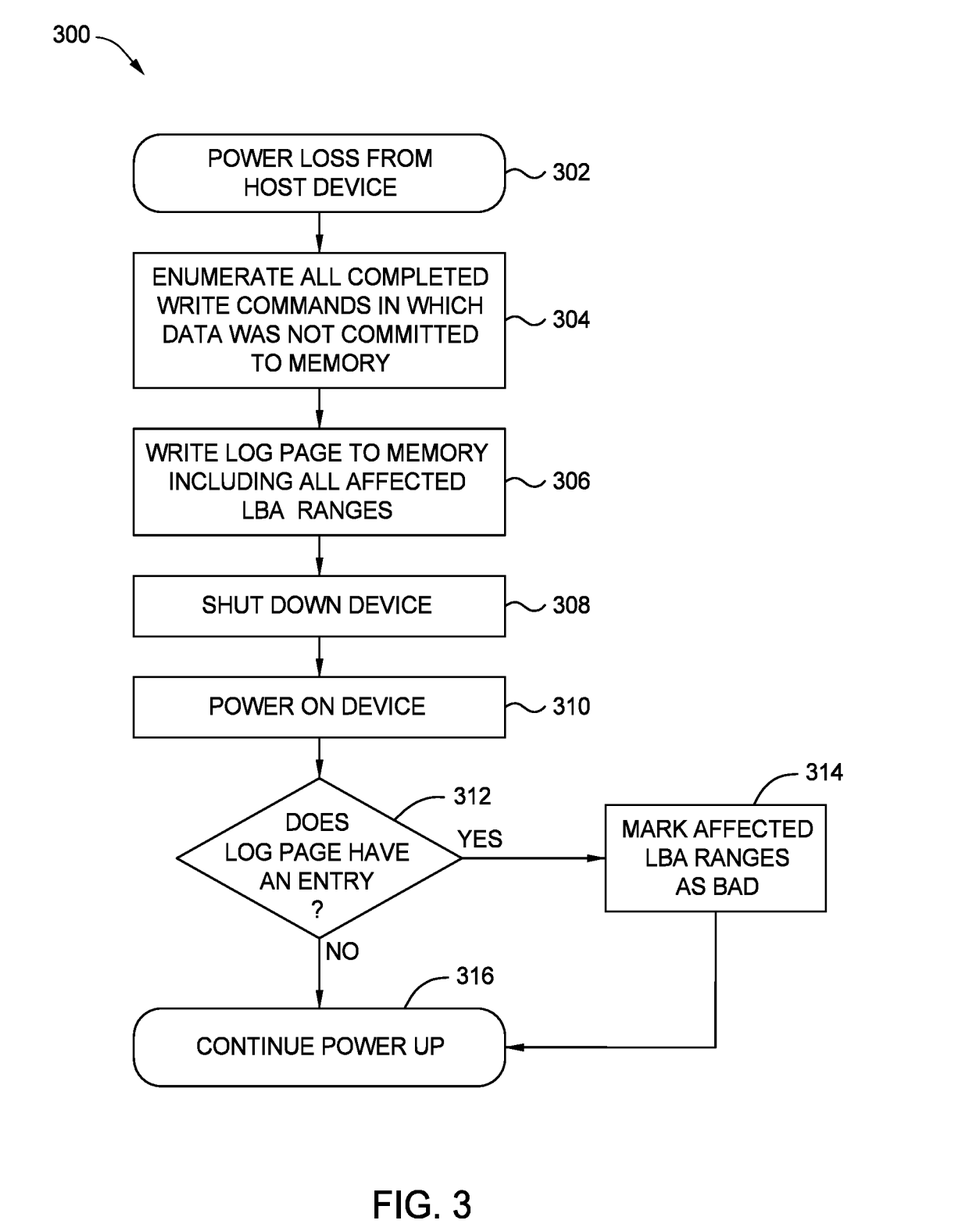
FIG. 3 is a flowchart illustrating a method of delayed write failure process according to one embodiment.

FIG. 3 is a flowchart 300 illustrating a method of delayed write failure process according to one embodiment. The method begins at 302 when there is a power loss event whereby power from the host device is discontinued. At the point in time that the power loss is first realized, all completed write commends in which data was not committed to the memory in the storage device are enumerated in 304. The write commands that are completed, but not committed to the memory in the storage device are the delayed write failure commands. The write commands are completed from the host perspective, but the storage device has not written the data to the memory device.

Because there is a delayed write failure, the affected LBA ranges are written to the log page in the memory device in 306, and then the storage device shuts down at 308. Eventually, the host device needs the storage device and thus powers on the storage device at 310, and consequently begins to charge the capacitor. At that time, the controller checks the log page of the memory device to check whether any entries are present in 312. If there are no entries in the log page, then there was no delayed write failure and the storage device continues to power up at 314. If, however, the log page contains an entry, the LBA ranges are marked as bad at 314. Once the LBA ranges are identified as bad, the LBA ranges may be provided to the host device so that the host device is aware that a delayed write failure has occurred. The host device may then being the process of obtaining the data from another source from another tier of storage.

Figure 4:
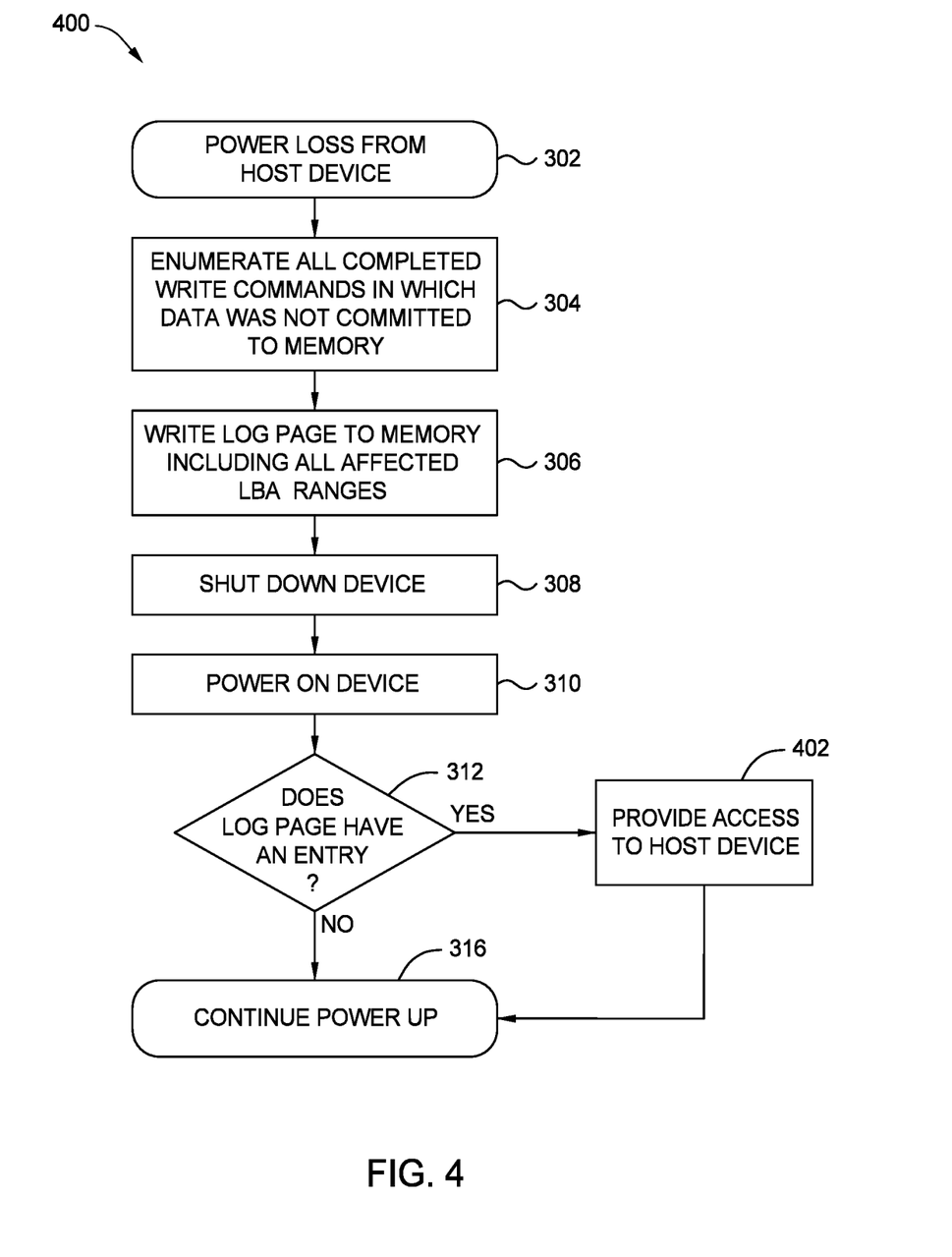
FIG. 4 is a flowchart illustrating a method of delayed write failure process according to another embodiment.

FIG. 4 is a flowchart 400 illustrating a method of delayed write failure process according to another embodiment. The method shown in FIG. 4 is similar to the method shown in FIG. 3, however, rather than simply marking the affected LBA ranges as bad in 314, the controller provides the host access to the log table in 402. The host device, once having access to the log page 208 may then have knowledge of the delayed write failure and of the specific LBA ranges impacted. The host device may then proceed with obtaining the data from another source from another tier of storage.

Figure 5:
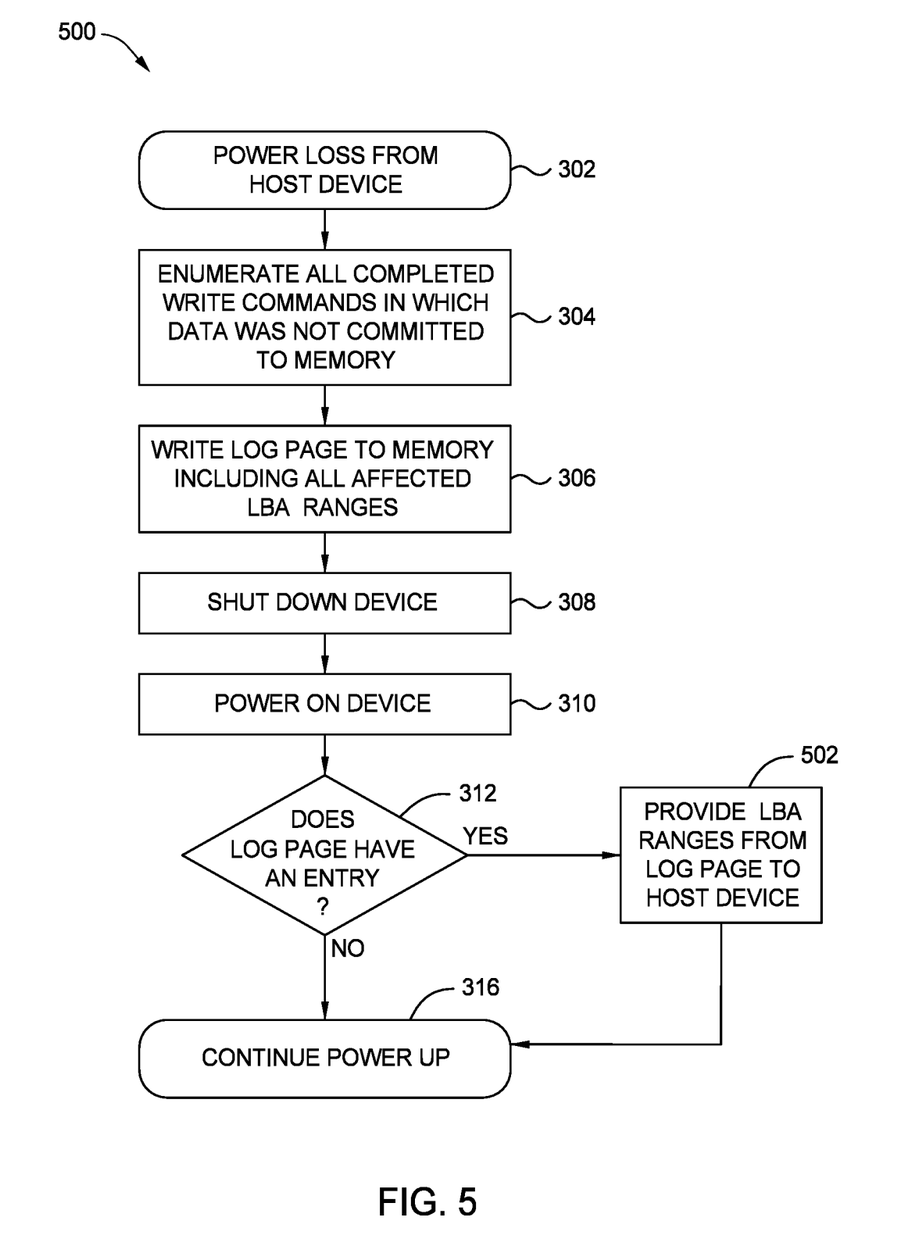
FIG. 5 is a flowchart illustrating a method of delayed write failure process according to another embodiment.

FIG. 5 is a flowchart 500 illustrating a method of delayed write failure process according to another embodiment. The method shown in FIG. 5 is similar to the method shown in FIGS. 3 and 4, however, rather than simply marking the affected LBA ranges as bad in 314 or providing the host access to the log table in 402, the controller provides the specific LBA ranges from the log page 208 to the host device. The host device, once having access to the LBA ranges from the log page 208 may then have knowledge of the delayed write failure and of the specific LBA ranges impacted. The host device may then proceed with obtaining the data from another source from another tier of storage.

It is to be understood that for a delayed write failure issue, the storage device may mark the affected LBA ranges as bad, may provide the host with access to the log page, may provide the specific affected LBA ranges to the host, or any combination thereof. The disclosure is not limited to either marking, providing access or providing LBA ranges.

By utilizing a local power source, namely at least one capacitor on the storage device itself, the amount of energy needed to revert data within the storage device is a consistent state even in a power loss event. Because the amount of energy needed is reduced to the amount of capacity needed to simply write about 4K worth of data to one dedicated log page, client-grade SSDs are not only feasible, but desirable for data centers.

In one embodiment, a storage device comprises: a non-volatile memory; and a controller configured to, upon detection of a power loss event, write LBA ranges to a log stored in the non-volatile memory and to provide the LBA ranges to the host device. The storage device further comprises a capacitor coupled to the controller. The controller is configured to mark the LBA ranges as bad. The controller is configured to detect the power loss event. The controller is configured to enumerate all completed write commands in which data was not committed to the non-volatile memory. The log is a single page. The non-volatile memory is NAND. The storage device is client grade SSD. The controller is configured to: read LBA ranges from the log, and wherein the log is a page that lists delayed write failures; and provide the LBA ranges to a host device.

In another embodiment, a storage device comprises: memory means; means to write LBA ranges to a low storage in the memory means upon detection of a power loss event; and means to provide the LBA ranges to a host device. The storage device further comprises means to deliver power to the storage device after detection of the power loss event. The storage device further comprises means to receive a power loss signal.

In another embodiment, a storage device comprises: at least one memory device containing a delayed write failure log page; and a controller coupled to the at least one memory device, the controller configured to: detect a power loss event; enumerate all completed write commands in which data was not committed to the memory device; writing one or more LBA ranges to the log page, wherein the one or more LBA ranges correspond to the data that was not committed to the memory device; and deliver the one or more LBA ranges to a host device. The controller is further configured to: power on the storage device; and check the log page for one or more LBA ranges. The controller is further configured to make the log page available to the host device. The controller is further configured to receive the data that was not committed to the memory device from locations other than a host device, wherein the receiving occurs after powering up the storage device. The controller is further configured to mark the one or more LBA ranges as bad in the log page. The controller is further configured to communicate to the host device that the one or more LBA ranges are bad. The memory device is NAND. The controller is further configured to receive power from a capacitor after detecting the power loss event and prior to writing the LBA ranges to the log page.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising: a non-volatile memory; and a controller configured to, upon detection of a power loss event, write logical block address (LBA) ranges to a log stored in the non-volatile memory and to provide the log to a host device so that the host device has knowledge of delayed write failure and the LBA ranges stored in the log, and wherein the LBA ranges are associated with completed write commands not yet programmed to the non-volatile memory.

2. The storage device of claim 1, further comprising a capacitor coupled to the controller.

3. The storage device of claim 1, wherein the controller is configured to mark the LBA ranges as bad.

4. The storage device of claim 1, wherein the controller is configured to detect the power loss event.

5. The storage device of claim 1, wherein the controller is configured to enumerate all completed write commands in which data was not committed to the non-volatile memory.

6. The storage device of claim 1, wherein the log is a single page.

7. The storage device of claim 1, wherein the non-volatile memory is NAND.

8. The storage device of claim 1, wherein the storage device is client grade SSD.

9. The storage device of claim 1, wherein the controller is configured to:
read LBA ranges from the log, and wherein the log is a page that lists delayed write failures; and
provide the LBA ranges to a host device.

10. A storage device, comprising: a memory device; and a controller coupled to the memory device, wherein the controller is configured to: write logical block address (LBA) ranges to a log storage in the memory device upon detection of a power loss event; and provide the LBA ranges to a host device so that the host device has knowledge of delayed write failure and the LBA ranges stored in the log storage, and wherein the LBA ranges are associated with completed write commands not yet programmed to the memory device.

11. The storage device of claim 10, further comprising a device to deliver power to the storage device after detection of the power loss event.

12. The storage device of claim 10, further comprising a device to receive a power loss signal.

13. A storage device, comprising: at least one memory device containing a delayed write failure log page; and a controller coupled to the at least one memory device, the controller configured to: detect a power loss event;
enumerate all completed write commands in which data was not committed to the memory device; writing one or more logical block address (LBA) ranges to the delayed write failure log page, wherein the one or more LBA ranges correspond to the data associated with completed write commands that was not committed to the memory device; and deliver the one or more LBA ranges to a host device so that the host device has knowledge of delayed write failure and the one or more LBA ranges stored in the log.

14. The storage device of claim 13, wherein the controller is further configured to:
power on the storage device; and
check the delayed write failure log page for one or more LBA ranges.

15. The storage device of claim 14, wherein the controller is further configured to make the delayed write failure log page available to the host device.

16. The storage device of claim 14, wherein the controller is further configured to receive the data that was not committed to the memory device from locations other than a host device, wherein the receiving occurs after powering up the storage device.

17. The storage device of claim 13, wherein the controller is further configured to mark the one or more LBA ranges as bad in the delayed write failure log page.

18. The storage device of claim 17, wherein the controller is further configured to communicate to the host device that the one or more LBA ranges are bad.

19. The storage device of claim 13, wherein the memory device is NAND.

20. The storage device of claim 13, wherein the controller is further configured to receive power from a capacitor after detecting the power loss event and prior to writing the LBA ranges to the delayed write failure log page.

\* \* \* \* \*